United States Patent
Jensen et al.

(10) Patent No.: US 6,649,261 B2
(45) Date of Patent: Nov. 18, 2003

(54) ROD-SHAPED PREFORM FOR MANUFACTURING AN OPTICAL FIBER THEREFROM, A METHOD FOR MANUFACTURING SUCH A ROD-SHAPED PREFORM AS WELL AS A METHOD FOR MANUFACTURING AN OPTICAL FIBER, USING SUCH A ROD-SHAPED PREFORM

(75) Inventors: Henrikus Lambertus Maria Jensen, Bergeijk (NL); Marinus Jacob de Fouw, Eindhoven (NL)

(73) Assignee: Draka Fibre Technology B.V., Eindhoven (NL)

( * ) Notice: Subject to any disclaimer, the term of this patent is extended or adjusted under 35 U.S.C. 154(b) by 164 days.

(21) Appl. No.: 09/785,082

(22) Filed: Feb. 14, 2001

(65) Prior Publication Data
US 2001/0020372 A1 Sep. 13, 2001

(30) Foreign Application Priority Data
Feb. 14, 2000 (NL) .............................. 1014374

(51) Int. Cl.[7] .............................. D02G 3/00; G02B 6/18
(52) U.S. Cl. ........................ 428/359; 428/364; 428/373; 385/124

(58) Field of Search ................................. 428/364, 359; 385/124, 373

(56) References Cited

FOREIGN PATENT DOCUMENTS

| EP | 0 530 917 A1 | 3/1993 |
| EP | 0 999 189 A1 | 5/2000 |
| JP | 56 014441 A | 2/1981 |
| JP | 61 251536 A | 11/1986 |
| JP | 61 251536 A | 11/1986 |
| JP | 02 164738 A | 6/1990 |
| JP | 04 154642 A | 5/1992 |
| JP | 07 330362 A | 12/1995 |
| JP | 11 079772 A | 3/1999 |

*Primary Examiner*—Cynthia H. Kelly
*Assistant Examiner*—J. M. Gray
(74) *Attorney, Agent, or Firm*—Seed IP Law Group PLLC; Dennis M. de Guzman

(57) ABSTRACT

The present invention relates to a rod-shaped preform for manufacturing an optical fiber therefrom, as well as to a method for manufacturing such a rod-shaped preform. The present invention furthermore relates to a method for manufacturing an optical fiber, wherein one end of a rod-shaped preform is subjected to a heat treatment, after which the thus softened end of the rod-shaped preform is subjected to a pulling force for the purpose of drawing an optical fiber therefrom.

9 Claims, 1 Drawing Sheet

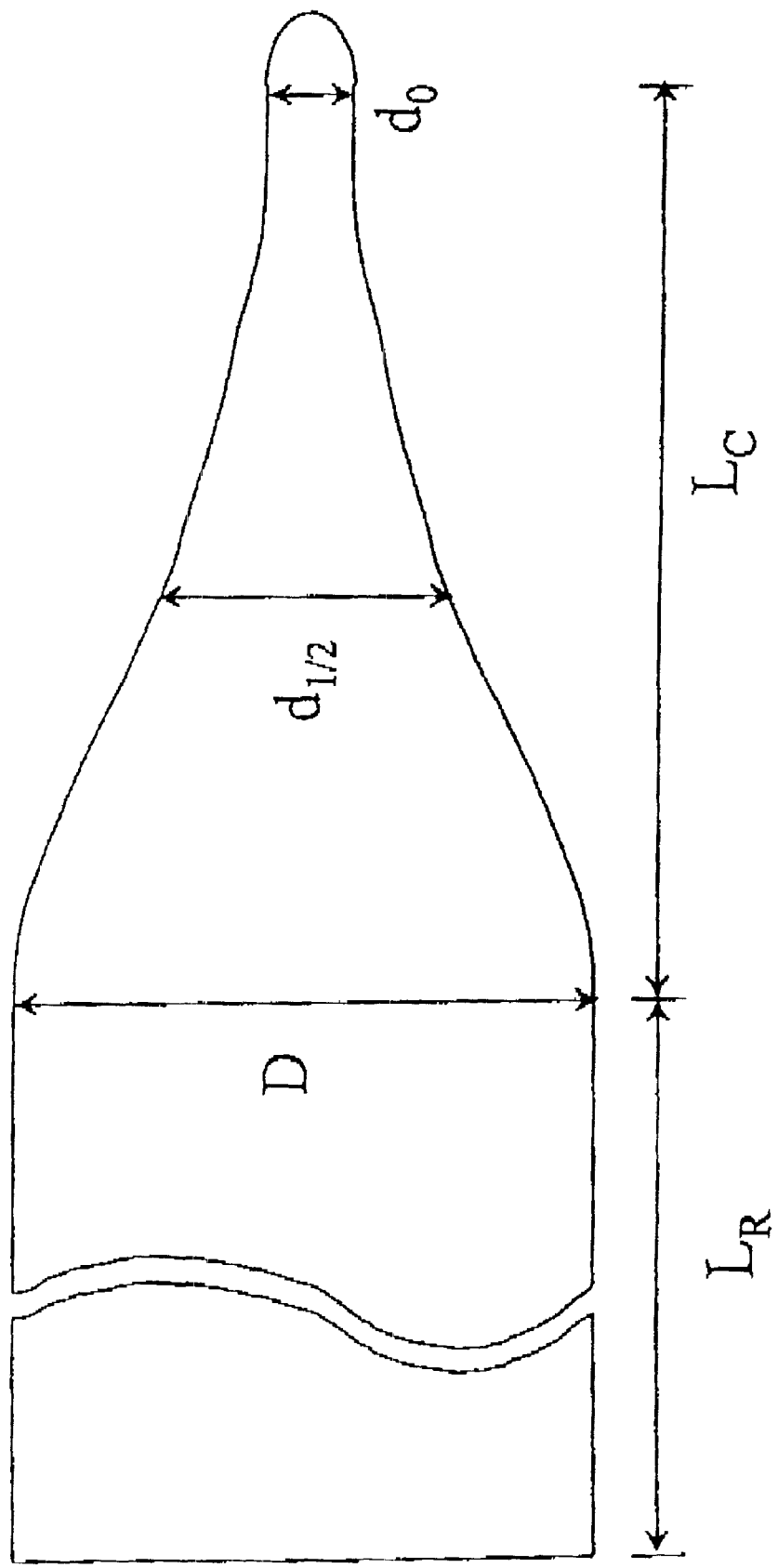

ROD-SHAPED PREFORM FOR MANUFACTURING AN OPTICAL FIBER THEREFROM, A METHOD FOR MANUFACTURING SUCH A ROD-SHAPED PREFORM AS WELL AS A METHOD FOR MANUFACTURING AN OPTICAL FIBER, USING SUCH A ROD-SHAPED PREFORM

A rod-shaped preform for manufacturing an optical fibre therefrom, a method for manufacturing such a rod-shaped preform as well as a method for manufacturing an optical fibre, using such a rod-shaped preform.

The present invention relates to a rod-shaped preform for manufacturing an optical fibre therefrom, as well as to a method for manufacturing such a rod-shaped preform. The present invention furthermore relates to a method for manufacturing an optical fibre, wherein one end of a rod-shaped preform is subjected to a heat treatment, after which the thus softened end of the rod-shaped preform is subjected to a pulling force for the purpose of drawing an optical fibre therefrom.

Such a preform is known from Japanese patent publication JP-A-11079772, and according to said document said preform can be regarded as a plurality of separate grooves of different depths which are disposed at the end of the preform, perpendicularly to the axial direction of the preform. Such a stepped diameter reduction is disadvantageous, because in the furnace the glass of the preform softens at the location of such a step, to such an extent that the material sags from the furnace from the location of said step. Since the cone geometry is heated by the furnace at the circumference thereof, there is a considerable risk of softening of the zones beside the centre of the preform, as a result of which drawing will not take place from the centre of the cone, which is undesirable.

Such a preform is also known per se from European patent application no. 0 530 917 filed in the name of the present applicants. The preform known therefrom can be regarded as a rod-shaped preform having a uniform diameter along its entire length. When an optical fibre is to be drawn from such a rod-shaped preform, said rod-shaped preform is heated in a furnace at one end, so that a softening zone is formed. During said heating the zone thus softened is subjected to a pulling force, after which the plastic condition of said softened zone makes it possible to draw the optical fibre therefrom. According to said patent publication the direction of the heating zone will be opposed to that of the pulling force being exerted on the softened end.

The current developments in the glass fibre industry show a tendency towards increasing the capacity of the rod-shaped preform. Such a capacity increase is effected mainly by increasing the diameter of the rod-shaped preforms. It would also be possible, however, to increase the length of the rod-shaped preforms, but such a measure would lead to problems in practice, since the current equipment on which the preforms are manufactured is not suitable therefor. In addition, long preforms are difficult to handle.

The term "rod-shaped preform" as used in the present introduction to the disclosure is understood to include both a massive rod and a tube, in particular a rod surrounded by one or more concentric tubes. Generally, such a rod-shaped preform is drawn out in a draw tower to form an optical fibre having a diameter of about 125 $\mu$m. During said drawing the rod-shaped preform is slowly moved through the furnace, whereupon it will melt at one end thereof, thus forming a cone. From said cone, which has been obtained by heating, the aforesaid glass fibre is carried away at a high velocity. Thus the starting up of the drawing process, in particular the forming of the cone, will take up a considerable amount of time when using the current generation of rod-shaped preforms, in particular preforms having a large diameter. It should be understood that this start-up time is substantially longer when rod-shaped preforms having a larger diameter are used. Owing to the above-described tendency, wherein rod-shaped preforms having a larger diameter are to be processed, it is thus desirable that the start-up time of the drawing process be influenced advantageously, thus making it possible to shorten the drawing process, in particular the start-up phase thereof.

The object of the present invention is thus to provide a rod-shaped preform, which rod-shaped preform has a geometry that makes it possible to reduce the start-up phase of the drawing process to a significant degree.

Another object of the present invention is to provide a method for manufacturing a rod-shaped preform, which rod-shaped preform effects a significant reduction of the start-up phase of the drawing process, in particular in the case of preforms having a large diameter.

Another object of the present invention is to provide a rod-shaped preform for manufacturing an optical fibre therefrom, as well as a method for manufacturing said optical fibre, wherein a precisely defined geometry of the end of the rod-shaped preform can be effected.

According to the present invention, the rod-shaped preform for manufacturing an optical fibre as referred to in the introduction is characterized in that one end of a rod-shaped preform has a cone-like geometry, which cone-like geometry complies with the following equations:

$$\frac{D}{d_0} = 2 - 25, \quad \frac{D}{d_{\frac{1}{2}}} = 1,2 - 5, \quad \frac{L_C}{D} = 0,8 - 3,5 \quad en \quad D > d_{\frac{1}{2}} > d_0$$

wherein
$L_c$=the cone length (mm)
D=the diameter of the rod-shaped preform (mm)
$d_O$=the diameter of the rod-shaped preform at the cone end (mm)
$d_{1/2}$=the diameter of the rod-shaped preform halfway the cone (mm).

Although European patent application no. 0 999 189 (not pre-published) discloses a preform having a reduced diameter, said publication does not provide any indication as to the aforesaid combination of requirements, in particular the ratio between $d_{1/2}$ and D, which the present preform is to meet in order to reduce the start-up phase of the drawing process to a significant degree.

By giving the rod-shaped preform a cone-like geometry already before the eventual drawing process, the time required for the drawing process, in particular the start-up phase thereof, is considerably reduced. Thus it is in particular desirable for the rod-shaped preform to comprise an end having a cone-like geometry, the shape of which cone-like geometry substantially corresponds to that of the cone that would automatically form upon continuous drawing of the optical fibre from the rod-shaped preform. Thus also the time needed to achieve the desired end velocity can be reduced considerably in such an embodiment. It should be apparent, therefore, that the present preform can be regarded as a preform from which the optical fibre is yet to be drawn, which rod-shaped preform should not be mixed up with the rod-shaped preform that is already known from the prior art, from which an optical fibre has already been drawn. The cone geometry starts at the tip of the preform, where diameter D starts to decrease. The present cone geometry can be regarded as a flowing, continuous reduction from diameter D to diameter $d_O$ which geometry essentially differs from the discontinuous, stepped geometry in accordance with JP-A-11079772.

The aforesaid ratio $D/d_O$ is important in particular in order to generate a specific diameter reduction so as to provide the desired effect, in particular a shortened start-up phase of the eventual drawing process. It should be understood that the lower limit of the ratio $D/d_O$ especially applies to rod-shaped preforms having a small diameter, in particular rod-shaped preforms having a diameter upwards of about 30 mm. The upper limit of the ratio $D/d_O$ especially applies to rod-shaped preforms having a larger diameter, in particular rod-shaped preforms having a diameter of about 150 mm. It should be noted, however, that the present rod-shaped preform is not restricted to a specific diameter in any embodiment thereof, but only to the ratios between the cone-like geometry and the rod-shaped preform as described before.

The aforesaid ratio $D/d_{1/2}$ relates to the specific geometry of the softened end of the rod-shaped preform, in particular the cone. If this ratio is larger than 5, the end of the cone will exit the heated zone too quickly, which means that too large a glass mass will exit the furnace, which is undesirable. If the aforesaid ratio is less than a lower limit of 1.2, the time that is required for accelerating the start-up phase of the eventual drawing process will be reduced to an insufficient degree, so that the object aimed at is not fully accomplished.

The aforesaid ratio $L_c/D$ depends in particular on the length of the heating zone in the furnace that is used for effecting the cone-like geometry at the end of the present rod-shaped preform, in particular before the eventual drawing process for obtaining the optical process takes place. As already described before, it is preferred that the length of the cone-like geometry at the end of the rod-shaped preform substantially corresponds to the shape of the cone that would be formed during the eventual drawing of the fibre. In general it obtains that the heating zone will need to be longer when the rod-shaped preform has a larger diameter. If the heating zone is too short, the furnace in question will have to provide a higher temperature, which will lead to a high shearing rate in the cone upon eventual drawing of the fibre from the present rod-shaped preform. Said higher temperature will have an adverse effect as regards the occurrence of defects in the eventual glass fibre, mainly due to a higher UV load and a higher shearing rate. If a longer heating zone is used, however, the required temperature will be lower indeed, but the residence time of the end of the rod-shaped preform in the heating zone will be longer, which will result in a larger number of defects due to the fact that the rod-shaped preform is exposed to the UV load for a longer period of time.

It is in particular preferred that the present rod-shaped preform, which has a cone-like geometry at one end, complies with the equation;

$$\frac{L_R}{L_C} = > 4,$$

wherein:
$L_R$=the length of the rod-shaped preform (mm).

Such a ratio $L_R/L_c$ is in particular desirable in order to achieve a high production capacity. If the ratio lies outside the aforesaid range, the present rod-shaped preform will moreover be difficult to handle.

In a special embodiment of the present invention, the present rod-shaped preform can be regarded as a rod-shaped preform comprising a core and a core-surrounding cladding, wherein the index of diffraction of the cladding is lower than that of the core.

The present invention furthermore relates to a method for manufacturing a rod-shaped preform having a cone-like geometry at one end, in particular the rod-shaped preform as described above, which method is according to the present invention characterized in that it comprises the following steps:

i) heating one end of the rod-shaped preform in a heating zone while rotating the same, ii) exerting a pulling force on the end heated in step i), in order to remould part of said end into a cone-like geometry, iii) moving the heating zone along the length of the end of the rod-shaped preform until said end has said cone-like geometry, iv) cooling down the rod-shaped preform obtained in step iii), which comprises said cone-like geometry at one end.

It is in particular preferred that the heating in the aforesaid step i) is carried out by bringing the end of the rod-shaped preform into contact with a plasma which envelopes the end of the rod-shaped preform symmetrically, which plasma is generated in a plasma gas outside the rod-shaped preform, using means for generating a plasma.

It is in particular preferred that the direction of flow of the plasma gas includes an angle of 90° with the axis of the rod-shaped preform, wherein the plasma is in particular an oxygen plasma or an oxygenous plasma.

The provision of a cone-like geometry at the end of the present rod-shaped preform is preferably carried out by means of a plasma flame. A plasma flame is in particular suitable if a rod-shaped preform having a large diameter is used, in particular a rod-shaped preform having a cross-sectional area of more than 1000 mm². The plasma flame is known to have a temperature of about 10,000 K, as a result of which an adequate penetration depth in the rod-shaped preform is obtained, so that the rod-shaped preform is softened over its complete cross-sectional area. In addition to that the plasma flame exhibits hardly any thrust, because the gases required for said plasma are supplied at atmospheric pressure. A low thrust has the advantage that the cone-like geometry is not adversely affected. In a special embodiment of the present invention an oxygen plasma or an exogenous plasma is used, as a result of which quartz is prevented from burning off at the high temperature due to an oxidizing environment. In addition, no undesirable cooling of the plasma flame takes place thereby.

In a special embodiment it is moreover possible that the heating in step i) is carried out by bringing the end of the rod-shaped preform into contact with a hydrogen/oxygen flame, wherein an excess amount of oxygen is supplied in particular to the hydrogen/oxygen flame.

This special embodiment can in particular be used for rod-shaped preforms having a relatively small cross-sectional area. With such rod-shaped preforms having a cross-sectional glass area of less than 1000 m$^2$, the softened end of the rod-shaped preform is slightly sensitive to the thrust of the hydrogen/oxygen flame, wherein in particular said heating while rotating must be carried out accurately.

The present invention furthermore relates to a method for manufacturing an optical fibre, wherein one end of a rod-shaped preform is subjected to a heat treatment, after which the thus softened end of the rod-shaped preform is subjected to a pulling force for the purpose of drawing an optical fibre therefrom, which method is characterized in that the present rod-shaped preform is used. The present invention furthermore relates to an optical fibre obtained in accordance with the above-described method.

The present invention will now be explained with reference to the appended FIGURE.

The appended FIGURE schematically shows the required parameters for the present rod-shaped preform. In the FIGURE the length of the rod-shaped preform is indicated at $L_R$. Since the end of the rod-shaped preform is heated in a heating zone while being rotated and being subjected to a pulling force, the heated end will be remoulded into an end having a cone-like geometry, wherein the length of the cone is schematically indicated at $L_C$. The diameter of the rod-shaped preform is indicated at D in the accompanying FIGURE. In the FIGURE the diameter of the rod-shaped preform halfway the cone is furthermore indicated at $d_{1/2}$, the diameter of the rod-shaped preform at the and of the cone is indicated at $d_O$. It should be noted that the spherical end, which is positioned at $d_O$ in the FIGURE, should not be regarded as essential for the present invention. It is in particular important that the rod-shaped preform that is shown in the FIGURE has not yet been subjected to a drawing process for the purpose of forming the optical fibre therefrom, but that the preform thus provided with a cone-like geometry is suitable for subsequent production of the optical fibre yet, which optical fibre will be formed at $d_O$.

What is claimed is:

1. A rod-shaped preform for manufacturing an optical fiber therefrom, characterized in that one end of a rod-shaped preform has a cone-like geometry, which cone-like geometry complies with the following equations:

$$\frac{D}{d_0} = 2-25, \ \frac{D}{d_{\frac{1}{2}}} = 1.2-5, \ \frac{L_C}{D} = 0.8-3.5 \text{ and } D > d_{\frac{1}{2}} > d_0$$

wherein
$L_C$=the cone length (mm)
D=the diameter of the rod-shaped preform (mm)
$d_0$=the diameter of the rod-shaped preform at the cone end (mm)

$d_{1/2}$=the diameter of the rod-shaped preform halfway the cone (mm), and
wherein the diameter of the cone near $d_0$ is substantially constant for at least a portion of $L_C$ near $d_0$.

2. A rod-shaped preform according to claim 1, characterized in that said cone-like geometry complies with the equation:

$$\frac{L_R}{L_C} = >4,$$

wherein:
$L_R$=the length of the rod-shaped preform (mm).

3. A rod-shaped preform according to claim 1, characterized in that said rod-shaped preform comprises a core and a core-surrounding cladding, wherein the index of diffraction of the cladding is lower than that of the core.

4. The rod-shaped perform according to claim 1 wherein a shape of the cone-like geometry corresponds to that of a cone that would be formed during subsequent drawing of the optical fiber.

5. An article of manufacture, comprising:
a rod-shaped preform for producing an optical fiber therefrom, wherein one end of the rod-shaped preform has a cone having a cone-like geometry that continuously reduces in diameter along most of a length of the cone, which cone-like geometry complies with:

$$\frac{D}{d_0} = 2-25, \ \frac{D}{d_{\frac{1}{2}}} = 1.2-5, \ \frac{L_C}{D} = 0.8-3.5 \text{ and } D > d_{\frac{1}{2}} > d_0$$

wherein
$L_C$=cone length;
D=diameter of the rod-shaped perform;
$d_0$=diameter of the rod-shaped preform at the cone end;
$d_{1/2}$=diameter of the rod-shaped preform halfway the cone; and
wherein a diameter of the cone near $d_0$ is substantially constant for at least a portion of $L_C$ near $d_0$.

6. The article of manufacture of claim 5 wherein the cone-like geometry complies with:

$$\frac{L_R}{L_C} = >4,$$

wherein:
$L_R$=length of the rod-shaped perform.

7. The article of manufacture of claim 5 wherein the rod-shaped preform comprises a core and a core-surrounding cladding, wherein an index of diffraction of the cladding is lower than that of the core.

8. The article of manufacture of claim 5 wherein a shape of the cone-like geometry corresponds to that of a cone that would be formed during subsequent drawing of the optical fiber.

9. The article of manufacture of claim 5 wherein the cone end at $d_0$ has a generally spherical shape.

* * * * *